United States Patent
Fairchild et al.

(10) Patent No.: US 6,364,543 B1
(45) Date of Patent: Apr. 2, 2002

(54) OPTICAL FIBER COUPLER ASSEMBLY

(75) Inventors: Scot C. Fairchild, Santa Clara; Charles Depuy, San Jose, both of CA (US)

(73) Assignee: Versatile Optical Networks, Inc., San Jose, CA (US)

( * ) Notice: Subject to any disclaimer, the term of this patent is extended or adjusted under 35 U.S.C. 154(b) by 0 days.

(21) Appl. No.: 09/714,777

(22) Filed: Nov. 15, 2000

Related U.S. Application Data

(60) Provisional application No. 60/235,381, filed on Sep. 25, 2000.

(51) Int. Cl.[7] ............................................. G02B 6/36
(52) U.S. Cl. ........................ 385/92; 385/93; 385/88; 385/52
(58) Field of Search ............................. 385/92, 93, 94, 385/88, 89, 90, 91, 31, 52, 33, 14

(56) References Cited

U.S. PATENT DOCUMENTS

| | | | | |
|---|---|---|---|---|
| 5,073,046 A | * | 12/1991 | Edwards et al. | ............... 395/90 |
| 5,091,991 A | * | 2/1992 | Briggs et al. | ............. 385/92 X |
| 5,138,679 A | * | 8/1992 | Edwards et al. | ............... 385/90 |
| 5,140,663 A | * | 8/1992 | Edwards et al. | ............... 385/90 |

* cited by examiner

*Primary Examiner*—Brian Healy
(74) *Attorney, Agent, or Firm*—Fish & Richardson P.C.

(57) ABSTRACT

Devices and techniques for engaging a fiber coupler module to a support platform using elongated engagement members.

16 Claims, 2 Drawing Sheets

OPTICAL FIBER COUPLER ASSEMBLY

This application claims the benefit of U.S. Provisional Application No. 60/235,381, pending, entitled LASER FIBER COUPLER ASSEMBLY and filed Sep. 25, 2000.

BACKGROUND

This application relates to techniques and mechanisms for mechanical mounting a fiber coupler module to a platform.

Certain optical transmitters and transceivers use a semiconductor laser as a light source to produce a light beam and an optic fiber to receive the light beam and transport it to a desired destination. Some coupling optics may be implemented between the laser and the fiber to facilitate the coupling of the light beam into the fiber. Various mechanical devices may be used to hold or mount the light source, the coupling optics, and the fiber to their respective positions with respect to one another so that proper optical alignment can be established and maintained.

SUMMARY

The systems and techniques of this application are in part based on the recognition that it may be desirable to integrate the light source, the coupling optics, and the fiber together in a single, compact module so that an optical transmitter or transceiver can be directly and conveniently coupled to a fiber system without extensive assembling steps and optical alignment. Examples of such integrated compact modules are provided to simplify the manufacturing, assembling, and optical alignment and to reduce the overall cost of such modules.

In one embodiment, elongated engagement members are used mount a fiber coupler module to a support platform so that a light source on the platform and the fiber coupler module are optically aligned.

DETAILED DESCRIPTION

Figure 1:
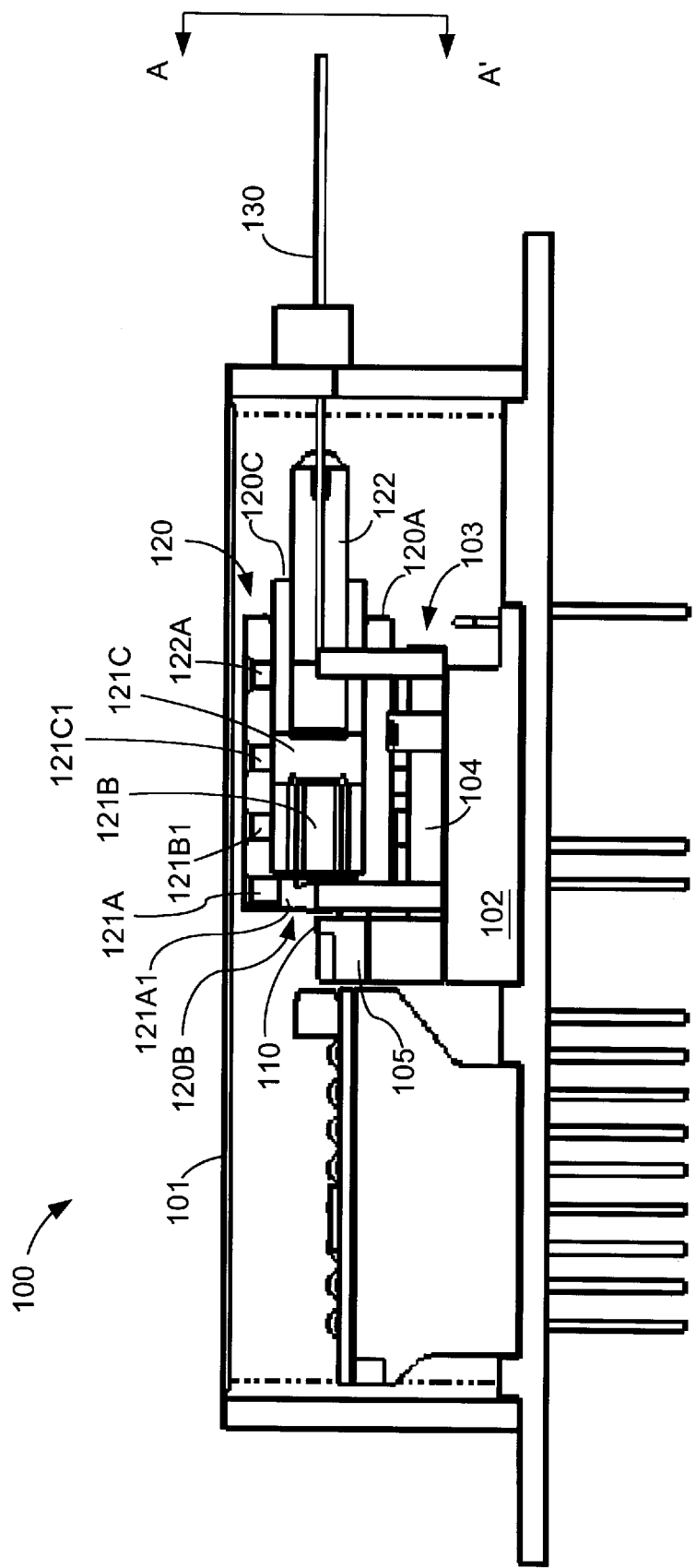
FIG. 1 shows one embodiment of an optical fiber coupler assembly which includes a support platform, a light source, and a fiber coupler module.

FIG. 1 shows an exemplary optical fiber coupler assembly 100 according to one embodiment. The entire assembly is built on a base 102 and is enclosed in a housing 101. A support module 103 is formed over the base 102 and may be a single piece formed of a rigid material or two separated pieces that are fixed to the base 102. The support module 103 may include a first part 105 to mount a light source 110 (e.g., diode laser or LED), and a second part which includes a support platform 104 to mount a fiber coupler module 120 so that the light source 110 and the fiber coupler module 120 are optically aligned with each other to couple the light from the laser 110 into the fiber coupler module 120. A fiber 130 is coupled to the fiber coupler module 120 to receive and transport the light from the laser 110 to a destination outside the assembly 100.

The fiber coupler module 120 may include a coupler housing 120A which has two openings 120B and 120C at opposite ends along the optical path of the assembly 100. The exterior of the coupler housing 120A may be cylindrical with some portion flattened for engaging to other components. The opening 120B is used to receive light from the laser 110 and the opening 120C is used to receive the fiber 130 into which the received light from the laser 110 is coupled. The coupler housing 120A may be designed to engage coupling optics and a fiber fitting unit 122 along the optical path of the light from the laser 110. The coupling optics may include, for example, a collimating lens 121A that modifies the divergent beam from the laser 110 to be collimated and a focusing lens 121C that focuses the collimated beam into the receiving terminal of the fiber 130. An optical isolator 121B may also be included to reduce adverse optical feedback to the laser 110 due to optical reflections at various surfaces in the optical path.

In one implementation, the coupler housing 120A may be designed to engage to the coupling optics 121 and the fiber fitting unit 122 without separate mounting devices. For example, a cylindrical through channel may be formed to connect the openings 120B and 120C. The coupling optics and the fiber fitting unit 122, when properly shaped, can be inserted into the cylindrical through channel and fixed at their proper positions relative to each other according to the optical parameters of the coupling optics so that the light from the laser 110 can be coupled into the fiber 130. One way for fixing the optical elements in the optics 121 and the fiber fitting unit 122 uses one or more set screws on the through holes 121A1, 121B1, 121C1, and 122A formed on the side wall of the coupler housing 120A. Alternatively, the optical elements 121A, 121B, 121C, and the fiber fitting unit 122 may be affixed at their respective positions by adhering them to the inner wall of the cylindrical through channel with a proper epoxy.

A special engagement mechanism may be implemented in the assembly 100 for mounting the fiber coupler module 120 onto the platform 104. This mechanism includes parts on both the fiber coupler module 120 and the platform 104 to fix the position and orientation of the fiber coupler module 120 on the platform 104 with respect to the laser 110.

Figure 2:
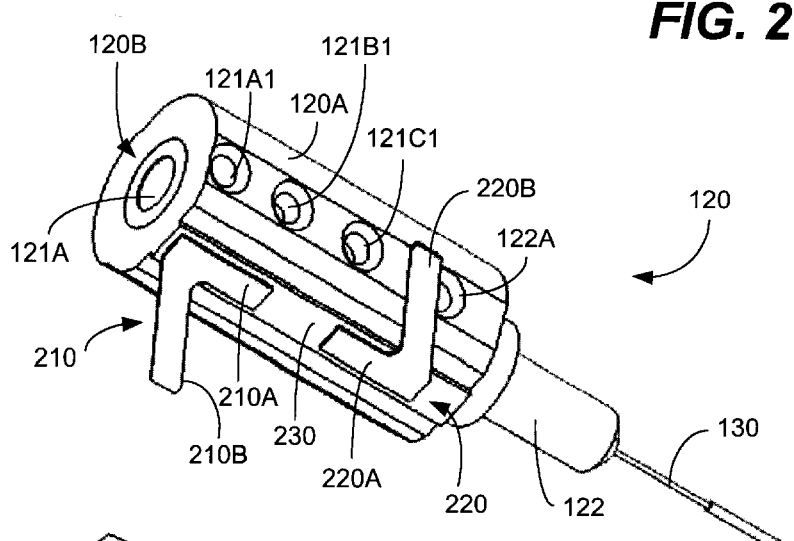
FIG. 2 shows a three-dimensional view of the fiber coupler module and its respective engagement mechanism for engaging to the support platform.

FIG. 2 shows two horizontal engaging bands 210 and 220 formed on the cylindrical exterior of the fiber coupler module 120 as one part of the engagement mechanism. The bands 210 and 220 may be formed of a metal, an alloy, or other suitable materials so that the bands 210 and 220 are substantially rigid but can be slightly deformed to produce a resilient force. Each horizontal band 210 or 220 includes a first elongated part, 210A or 220A, for engaging the band onto the fiber coupler module 120 and a second elongated part, 210B or 220B, for engaging the fiber coupler module 120 to the platform 104. The first and second parts, 210A and 219B, or 220A and 220B, in generally form an angle with respect to each other. This angle may be 90 degrees or an acute angle. A portion 230 of the cylindrical exterior of the fiber coupler module 120 may be flat for attaching the first parts 210A and 220A of the horizontal bands 210 and 220. The first parts of the two bands 210 and 220 may be fixed to the flat portion 230 of the fiber coupler module 120 at two different locations that are substantially along the cylindrical axis of the fiber coupler module 120. One way to attach the first parts 210A and 220A to the fiber coupler module 120 is laser welding.

Figure 3:
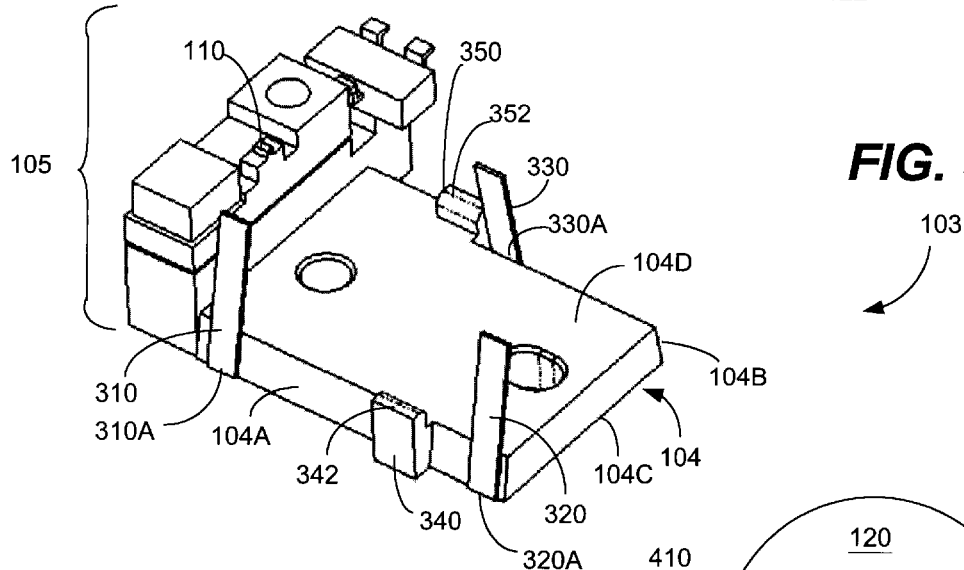
FIG. 3 shows a three-dimensional view of the support platform an its respective engagement mechanism for engaging to the fiber coupler module.

FIG. 3 shows another part of the engagement mechanism implemented on the platform 104. The platform 104 includes a top flat surface 104D to interface with flat portion 230 with the horizontal bands 210 and 220 of the fiber coupler module 120 and a bottom opposing surface 104C to be placed on the base 102. Three vertical bands 310, 320, and 330 are formed on two opposite side surfaces 104A and 104B of the platform 104. The opposite side surfaces 104A and 104B are substantially along the optic axis of the fiber coupler module 120 when the fiber coupler module 120 is set to a proper position relative to the platform 104. Two vertical bands 310 and 320 are engaged to two different locations 310A and 320A on the side surface 104A and the vertical band 330 is engaged to the opposite side surface 104B at a location 330A between 310A and 320A.

The opposite side surfaces 104A and 104B on the platform 104 may be parallel to each other or form a small acute angle towards each other so that the planes defined by the side surfaces 104A and 104B intercept each other on the side of the top supporting surface 104D. However configured, prior to engaging the vertical bands 310, 320, and 330 to the exterior of the fiber coupler module 120, the fiber coupler module 120 should be in contact with the vertical bands 310, 320, and 330 without causing substantial deformation so that the pressure at each contact area is small.

Figure 4:
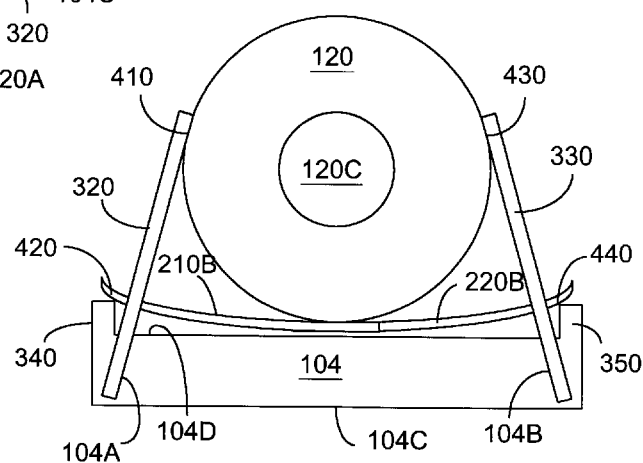
FIG. 4 shows the fiber coupler module and the support platform in engagement to each other.

FIGS. 3 and 4 illustrate the configuration where the vertical bands 310, 320, and 330 are slightly slanted with respect to the vertical direction at essentially the same angle as that between the side surfaces 104A and 104B. This angle is designed so that, when the fiber coupler module 120 is placed above the top supporting surface 104D between the vertical bands 310, 320 and the vertical band 330, each of the vertical bands 310, 320, and 330 is slightly deflected to touch the exterior surface of the fiber coupler module 120 and is slightly bent to apply a pressure on the fiber coupler module 120. This three-point contact configuration can secure a proper initial position of the fiber coupler module 120 to couple the light from the laser 110 into the fiber 130.

Two additional support structures 340 and 350 may also be respectively formed on the side surfaces 104A and 104B of the platform 340. Each support structure has a standoff portion, 342 or 352, above the top flat surface 104D of the platform 104 to contact and support a horizontal band, 220 or 210, respectively, when the fiber coupler module 120 is placed in a nominally aligned position over the platform 104. The support structures 340 and 350 are displaced from each other respectively along the side surfaces 104A and 104B by about the same spacing between the horizontal bands 210 and 220 on the fiber coupler module 120.

In assembly, the fiber coupler module 120 is first placed between the vertical bands 330, and 310, 320 so that the fiber coupler module 120 is suspended over the top supporting surface 104D by the two horizontal bands 210 and 220 that are respectively rest on the standoff portions 352 and 342 of the support structures 340 and 350. The upper portions of the vertical bands 310, 320, and 330 are slightly deflected to touch the exterior surface of the fiber coupler module 120. Similarly, the parts 210B and 220B of the horizontal bands 210 and 220 are also slightly deflected to exert a force against the fiber coupler module 120 so that the parts 210A and 220A on the flat portion 220 of the exterior of the module 120 are suspended above the top surface 104D with a small gap. Next, the position and orientation of the fiber coupler module 120 are adjusted to maximize the output from the fiber 130. Finally, the contacts of the vertical bands 310, 320, and 330 with the exterior of the fiber coupler module 120, and the contacts of the horizontal bands 210 and 220 with the platform 104 are fixed by, e.g., laser welding or epoxy, at the position where the optical coupling is at or near the maximum. All six degrees of freedom of the fiber coupler module 120 are now fixed with respect to the platform 140.

FIG. 4 illustrates a view along the lines AA' in FIG. 1 after the fiber coupler module 120 is placed above the platform 104. The vertical band 320 is shown to touch one side of the module 120 at a location 410. The vertical band 330 is shown to touch on the other side of the module 120 at another location 410. These locations 410 and 420 are fixed by welding or applying epoxy. Locations 420 and 440 are also fixed so horizontal bands 210 and 220 are fixed to the platform 104 without contacting the top surface 104D.

The following describes one exemplary flow in assembling such a system. First, the fiber coupler module 120 is assembled. The optical elements for the coupling optics 121, such as the lenses 121A, 121C, and the isolator 121B, are inserted and secured in their respective positions in the fiber coupler module 120 by using either a suitable epoxy or using the set screws 121A1, 121C1, and 121B1. Also, the fiber 130 is attached to the fiber fitting unit 122. The buffer on one distal end of the fiber 130 is removed. A portion of the fiber end is also metalized for soldering to the fiber fitting unit 122 which is formed of a metal. A suitable epoxy is dispensed in the fitting hole of the fiber fitting unit 122 to affix the fiber therein. The epoxy is then heated and cured. The receiving facet of the fiber in the fitting unit 122 is then polished. Next, the fiber fitting unit 122 is attached to the fiber coupler module 120 by, e.g., using a suitable epoxy. The fiber coupler mount 120 is then degassed by, e.g., baking at a high temperature, and hermetically sealed. Then, the fiber coupler mount 120 is mounted to the platform 104 and adjusted to optimize the optical coupling efficiency. Finally, the contact points of the bands are fixed to complete the assembly.

A number of advantages can be achieved by the above design. For example, the design is simple partially due to elimination of conventional optical mounts within the module housing 120A for placing the optical elements. This can reduce the cost of components. Also, the assembly process is simple due to the design and hence can reduce the time for alignment and assembly. This increases the throughput of the production and the further reduces the cost of each device.

Only a few examples are described. However, other modifications and enhancements may be made without departing from the following claims.

What is claimed is:

1. A device, comprising:
   a light source to produce a light beam;
   a fiber coupler module having coupling optics and a fiber, said coupling optics positioned to couple said light beam into said fiber;
   a support module having a first part to mount said light source and a second part with a support platform over which said fiber coupler module is positioned in optical alignment with said light source, said support platform having a top surface facing said fiber coupler module and first and second opposing side surfaces substantially parallel to an optical path of said light beam;
   first and second vertical elongated engagement members having first distal ends affixed to said first side surface to space from each other and second distal ends affixed to said fiber coupler module;
   a third vertical elongated engagement member having a first distal end affixed to said second side surface in a position between positions of said first and second vertical elongated engagement members along said optical path of said light beam, said third vertical elongated engagement member having a second distal end affixed to said fiber coupler module;

a first horizontal engagement member having a first part engaged to said fiber coupler module and a second part elongated in a direction nominally perpendicular to said first and second side surfaces and engaged to said support platform at a first location close to said first side surface; and a second horizontal engagement member having a first part engaged to said fiber coupler module at a location different from said first horizontal engagement member, and having a second part elongated in a direction nominally parallel to said second elongated part of said first horizontal engagement member and engaged to said support platform at a second location close to said second side surface.

2. The device as in claim 1, wherein each engagement member is slightly deflected to apply a pressure towards said fiber coupler module.

3. The device as in claim 1, wherein said fiber coupler module includes a housing and said coupling optics is directly engaged to a surface of said housing.

4. The device as in claim 3, wherein said housing includes a cylindrical through channel to transmit said light beam and to position said coupling optics and said fiber.

5. The device as in claim 4, wherein said fiber coupler module includes a fiber fitting unit to engage said fiber to said housing.

6. The device as in claim 1, wherein said coupling optics includes a first lens to receive said light beam from said light source and a second lens to focus said light beam into said fiber.

7. The device as in claim 5, wherein said coupling optics further includes an optical isolator positioned between said first and said second lenses to prevent light from traveling towards said light source.

8. The device as in claim 1, wherein said first and said second side surfaces form an angle so that two different planes defined by said first and said second side surfaces intercept on a side of said top surface where said fiber coupler module is located.

9. A device, comprising:

a platform having a top surface, and first and second side surfaces parallel to each other to intercept with said top surface at two opposing ends of said top surface;

a nominally cylindrical member positioned on said support surface and orientated with a cylindrical axis substantially parallel to said first and said second side surfaces;

first and second vertical elongated engagement members having first distal ends affixed to said first side surface to space from each other and second distal ends affixed to a first side of said cylindrical member;

a third vertical elongated engagement member having a first distal end affixed to said second side surface in a position between positions of said first and second vertical elongated engagement members along said cylindrical axis, said third vertical elongated engagement member having a second distal end affixed to a second, opposite side of said cylindrical member;

a first horizontal engagement member having a first part engaged to said cylindrical member and a second part elongated in a direction substantially perpendicular to said cylindrical axis and engaged to said support surface at a first location close to said first side surface; and a second horizontal engagement member having a first part engaged to said cylindrical member at a location different from said first horizontal engagement member, and having a second part elongated in a direction substantially parallel to said second elongated part of said first horizontal engagement member and engaged to said support platform at a second location close to said second side surface.

10. The device as in claim 9, wherein each of said first, said second, and said third vertical elongated engagement members is slightly deflected to apply a pressure towards said cylindrical member.

11. The device as in claim 9, wherein said platform includes a first standoff part adjacent to said first side surface and above said top surface to provide said first location for engaging said first horizontal engagement member to said platform, and a second standoff part adjacent to said second side surface and above said top surface to provide said second location for engaging said second horizontal engagement member to said platform.

12. The device as in claim 11, wherein each of said first and second horizontal engagement members is deflected to exert a force against said cylindrical member to suspend said cylindrical member above said top surface.

13. A method for engaging a cylindrical member above a platform at a fixed position, comprising:

affixing first and second vertical elongated bands on a first side surface of the platform at two different locations so that the vertical elongated bands are either vertical to or form an acute angle with respect to a top surface of the platform;

affixing a third vertical elongated band on a second side surface opposing the first side surface at a location between the first and the second vertical elongated bands;

placing the cylindrical member above the top surface between the first and the second side surfaces to respectively affix to the first, the second vertical elongated bands and the third vertical elongated band so that a cylindrical axis of the cylindrical member is substantially parallel to the first and the second side surfaces;

affixing a first end of a first horizontal elongated band to a first location on the cylindrical member and a second end near the first side surface; and affixing a second end of a second horizontal elongated band to a second location on the cylindrical member and a second end near the second side surface, the second location is displaced from the first location along the cylindrical axis.

14. The method as in claim 13, wherein the first and the second horizontal elongated bands are deflected to apply forces against the cylindrical member away from the top surface.

15. The method as in claim 13, wherein the first, second, and third vertical elongated members are deflected to apply pressure against the cylindrical member.

16. The method as in claim 13, wherein the cylindrical member includes a through hole along the cylindrical axis, and further comprising directly engaging optical elements in the through hole without using optical mounts.

* * * * *